US009773656B2

(12) United States Patent
Nishiguchi et al.

(10) Patent No.: US 9,773,656 B2
(45) Date of Patent: Sep. 26, 2017

(54) ION TRANSPORT APPARATUS AND MASS SPECTROMETER USING THE SAME

(71) Applicant: SHIMADZU CORPORATION, Kyoto-shi, Kyoto (JP)

(72) Inventors: Masaru Nishiguchi, Osaka (JP); Akiko Imazu, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/310,280

(22) PCT Filed: May 14, 2014

(86) PCT No.: PCT/JP2014/062835
§ 371 (c)(1),
(2) Date: Nov. 10, 2016

(87) PCT Pub. No.: WO2015/173911
PCT Pub. Date: Nov. 19, 2015

(65) Prior Publication Data
US 2017/0148620 A1 May 25, 2017

(51) Int. Cl.
*B01D 59/44* (2006.01)
*H01J 49/42* (2006.01)
(Continued)

(52) U.S. Cl.
CPC ............ *H01J 49/063* (2013.01); *H01J 49/22* (2013.01); *H01J 49/24* (2013.01); *H01J 49/422* (2013.01)

(58) Field of Classification Search
USPC ....... 250/281, 282, 283, 288, 289, 290, 291, 250/292, 293, 396 R, 397, 294, 29, 5,
(Continued)

(56) References Cited

U.S. PATENT DOCUMENTS 4,983,850 A 1/1991 Tsukakoshi et al.
6,107,628 A * 8/2000 Smith .................. H01J 49/066 250/292

(Continued)

FOREIGN PATENT DOCUMENTS

CA 1 249 381 A 1/1989
CN 101675496 A 3/2010

(Continued)

OTHER PUBLICATIONS

"IFunnel Technology for Enhanced Sensitivity in Tandem LC/MS", Agilent Technologies, (Searched on Apr. 22, 2014), On the Internet.

(Continued)

*Primary Examiner* — Bernard Souw
(74) *Attorney, Agent, or Firm* — Sughrue Mion, PLLC

(57) ABSTRACT

An off-axis ion transport optical system (20) including a front-stage quadrupole ion guide (21), a rear-stage quadrupole ion guide (22), and an ion deflector (23) is disposed inside an intermediate vacuum chamber (2) in a stage next to an ionization chamber (1) maintained at an atmospheric pressure. Both of the quadrupole ion guides (21 and 22) have the same configuration as that of a conventional ion guide that transports ions while trapping the ions using a radio-frequency electric field. The ion deflector (23) includes a pair of parallel flat electrodes (231 and 232) and deflects ions using a direct-current electric field. By causing the deflected ions to reach the ion receiving range of the rear-stage quadrupole ion guide (22), it is possible to efficiency introduce ions while deflecting the ions. Meanwhile, the ions and neutral particles are separated from each other in the ion deflector (23). This provides an off-axis structure ion transport optical system that achieves a high ion transmission efficiency with a simple structure.

12 Claims, 6 Drawing Sheets

(51) Int. Cl.
*H01J 49/06* (2006.01)
*H01J 49/22* (2006.01)
*H01J 49/24* (2006.01)

(58) Field of Classification Search
USPC .................................... 250/299, 492.21, 492
See application file for complete search history.

(56) References Cited

U.S. PATENT DOCUMENTS

| | | | | |
|---|---|---|---|---|
| 6,462,338 | B1 | 10/2002 | Inatsugu et al. | |
| 7,781,728 | B2 * | 8/2010 | Senko | H01J 3/14 250/281 |
| 7,915,580 | B2 * | 3/2011 | Splendore | H01J 49/066 250/281 |
| 9,601,323 | B2 * | 3/2017 | Nishiguchi | H01J 49/062 |
| 2007/0114392 | A1 | 5/2007 | Mukaibatake | |
| 2010/0090104 | A1 * | 4/2010 | Splendore | H01J 49/066 250/288 |
| 2010/0148062 | A1 | 6/2010 | Wollnik et al. | |
| 2011/0186732 | A1 * | 8/2011 | Yasuno | H01J 49/10 250/288 |
| 2013/0313421 | A1 | 11/2013 | Taniguchi | |
| 2016/0189946 | A1 * | 6/2016 | Nishiguchi | H01J 49/062 250/287 |

FOREIGN PATENT DOCUMENTS

| | | | |
|---|---|---|---|
| DE | 39 23 345 | A1 | 1/1991 |
| DE | 199 41 670 | A1 | 3/2000 |
| EP | 0 237 259 | A2 | 9/1987 |
| GB | 2 216 714 | A | 10/1989 |
| GB | 2 341 270 | A | 3/2000 |
| JP | 62-264546 | A | 11/1987 |
| JP | 1-252771 | A | 10/1989 |
| JP | 11-213940 | A | 8/1999 |
| JP | 2000-149865 | A | 5/2000 |
| JP | 2007-128694 | A | 5/2007 |
| JP | 2010-527095 | A | 8/2010 |
| JP | 2013-247000 | A | 12/2013 |
| JP | 2014-44110 | A | 3/2014 |
| WO | 2008/142801 | A1 | 11/2008 |
| WO | 2009/037483 | A2 | 3/2009 |
| WO | 2013/001604 | A1 | 1/2013 |

OTHER PUBLICATIONS

International Search Report of PCT/JP2014/062835, dated Jul. 1, 2014. [PCT/ISA/210].
Written Opinion for PCT/JP2014/062835 dated Jul. 1, 2014. [PCT/ISA/237].

* cited by examiner

ION TRANSPORT APPARATUS AND MASS SPECTROMETER USING THE SAME

CROSS REFERENCE TO RELATED APPLICATIONS

This application is a National Stage of International Application No. PCT/JP2014/062835 filed May 14, 2014, the contents of all of which are incorporated herein by reference in their entirety.

TECHNICAL FIELD

The present invention relates to an ion transport apparatus for transporting ions while trapping them, and more specifically, to an ion transport apparatus suitable for a mass spectrometer including an ion source for ionizing a sample in an atmosphere having a comparatively high level of gas pressure which is close to atmospheric pressure, such as an electrospray ionization mass spectrometer, atmospheric pressure chemical ionization mass spectrometer, and radio-frequency inductively coupled plasma ionization mass spectrometer. It also relates to a mass spectrometer using such an ion transport apparatus.

BACKGROUND ART

In a mass spectrometer using an atmospheric pressure ion source, such as an electrospray ionization (ESI), atmospheric pressure chemical ionization (APCI) or atmospheric pressure photoionization (APPI), the ionization chamber is maintained at a substantially atmospheric pressure, whereas the analysis chamber, which contains a mass separator (e.g. quadrupole mass filter) and an ion detector, needs to be maintained at a high degree of vacuum. Therefore, in such a mass spectrometer, the structure of a multistage differential pumping system is normally used, in which one or more intermediate vacuum chambers are provided between the ionization chamber and the analysis chamber so as to increase the degree of vacuum in a stepwise manner. In such a mass spectrometer having the structure of the multistage differential pumping system, an ion transport optical system, which may also be called the “ion lens” or “ion guide”, is arranged within each intermediate vacuum chamber. An ion transport optical system is a kind of optical device for transporting ions to the rear stage while focusing those ions (and accelerating or decelerating them in some cases) by the effect of a direct-current electric field, a radio-frequency electric field, or both of these two electric fields.

In order to transport ions while efficiently trapping them, ion transport optical systems with various structures and configurations have been used in conventional practices. In one widely used specific form of the ion transport optical system, multiple electrodes are provided around or along the ion beam axis, and two radio-frequency voltage whose phases are inverted from each other by 180 degrees are applied to any two electrodes neighboring each other among those electrodes. Owing to the effect of the radio frequency electric field created by the radio-frequency voltages, ions are transported while being trapped or focused. Representative examples of this specific form of ion transport optical system include: a multipole ion guide in which an even number of rod electrodes equal to or more than four are arranged around the ion beam axis; and a multipole array ion guide in which virtual rod electrodes, each of which consists of a number of plate electrodes arranged in the direction of the ion beam axis, are used in place of the normal rod electrodes.

Patent Literature 1 discloses an ion transport optical system having a structure called an “ion funnel”, in which a number of aperture electrodes each of which has a circular aperture are arranged along a traveling direction of ions, where the area of the apertures gradually decreases. The ion funnel applies high-frequency voltages whose phases are inverted from each other by 180 degrees to aperture electrodes neighboring each other in an ion beam axis direction, to create a radio-frequency electric field for focusing ions.

Patent Literature 2 discloses still another type of ion transport optical system, called a “radio-frequency carpet”, in which a number of ring electrodes are formed in a substantially concentric pattern on a printed circuit. The radio-frequency carpet applies high-frequency voltages whose phases are inverted from each other by 180 degrees to concentric ring electrodes neighboring each other in a radial direction, to create a radio-frequency electric field for focusing ions.

In short, these are both ion transport optical systems using the effect of a radio-frequency electric field.

In the aforementioned mass spectrometers, neutral particles such as molecules originating from a sample component that have not been ionized in an ionization chamber, and molecules originating from a sample solvent or originating from a mobile phase in a liquid chromatograph are introduced into an intermediate vacuum chamber in the next stage of the ionization chamber together with the generated ions. Such neutral particles are not affected by the electric field, and thus when the neutral particles reach an analysis chamber and are introduced into a quadrupole mass filter, the neutral particle may not be removed by the mass filter and may reach an ion detector. The neutral particles become a significant cause of noise in the ion detector. Thus, in recent years, an off-axis structure has been employed including an intermediate vacuum chamber of low-level vacuum at a stage next to the ionization chamber, where the axis of the ion introduction port of the intermediate vacuum chamber and the axis of the ion passage opening of the intermediate vacuum chamber for sending out ions to the next intermediate vacuum chamber are offset from each other.

In the off-axis structure, the traveling direction of a stream of ions that spread out around an ion beam axis while flying needs to be bent and turned into another direction. Therefore, in general, it is difficult to ensure a high ion transmission efficiency compared with the case where ion beam axes lie on a straight line. Thus, an off-axis structure ion transport optical system has been developed that captures ions using a radio-frequency electric field while bending the traveling direction of the ions.

For example, an ion transport optical system disclosed in Patent Literature 3 has a structure in which two ion funnels each formed by arranging electrodes of substantially C-shape made by cutting out part of rings are disposed substantially in parallel to each other with the respective cut-out portions brought close to each other. Then, by appropriately setting the condition of voltages applied to the electrodes of the ion funnels, ions are offset through the cut-out portions from one of the ion funnels to the other ion funnel, whereby achieving an off-axis structure. Non-Patent Literature 1 discloses a dual ion funnel of off-axis structure in which the central axes of two, front-stage and rear-stage ion funnels are offset from each other, and the traveling direction of ions is bent inside the rear-stage ion funnel.

However, in such a conventional ion transport optical system of off-axis structure, the structure or the shape of electrodes are complicated, or the condition of voltages applied to a number of electrodes is complicated. This significantly increases the cost of the apparatus and degrades the maintainability, as compared with typical ion transport optical systems. Additionally, in a dual ion funnel, neutral particles that have to be removed collide with an electrode of the ion funnel, and thus the electrode is prone to be contaminated, which easily causes a decline in ion-transporting performance with time.

CITATION LIST

Patent Literature

[Patent Literature 1] U.S. Pat. No. 6,107,628 B
[Patent Literature 2] JP 2010-527095 A
[Patent Literature 3] WO 2009/037483 A
[Patent Literature 4] WO 2013/001604 A

Non Patent Literature

[Non Patent Literature 1] "iFunnel Technology for Enhanced Sensitivity in Tandem LC/MS", Agilent Technologies, (Searched on Apr. 22, 2014), On the Internet

SUMMARY OF INVENTION

Technical Problem

The present invention has been developed to solve the previously described problems. Its main objective is to provide an off-axis structure ion transport apparatus in which electrodes have simple structures and shapes, and the condition of voltages applied to the electrodes is also simple, while neutral particles that constitute an obstacle to analysis can be reliably removed, and ions can be efficiently collected and transported to a rear stage, for example, a mass separator, other ion transport apparatus, or the like, and to provide a mass spectrometer including such an ion transport apparatus.

Another objective of the present invention is to provide an off-axis structure ion transport apparatus having a high maintainability and causing little contamination of an electrode by neutral particles that have to be removed, and to provide a mass spectrometer including such an ion transport apparatus.

Solution to Problem

An off-axis structure ion transport apparatus according to the present invention made to solve the above-described problems is an off-axis structure ion transport apparatus that emits ions entering along a first ion beam axis along a second ion beam axis not lying on a same line as the first ion beam axis, the ion transport apparatus including:

a) a front-stage ion transport unit for transporting the ions while focusing the ions along the first ion beam axis by an effect of radio-frequency electric field;

b) a rear-stage ion transport unit for transporting the ions while focusing the ions along the second ion beam axis by an effect of radio-frequency electric field;

c) an ion deflector disposed between the front-stage ion transport unit and the rear-stage ion transport unit, the ion deflector for deflecting a traveling direction of the ions by an effect of a direct-current electric field so that the ions emitted from the front-stage ion transport unit reach an ion receiving range of the rear-stage ion transport unit.

In a mass spectrometer including an atmospheric pressure ion source and having the structure of a multistage differential pumping system, the ion transport apparatus according to the present invention is typically installed in an intermediate vacuum chamber of low-level vacuum at a stage next to the ionization chamber for performing ionization using the atmospheric pressure ion source. Inside such an intermediate vacuum chamber, a gas pressure is relatively high due to gas flowing from the ionization chamber at a front-stage, and the energy of the ions is reduced by cooling due to the collision with the gas, and the ions are easily trapped in a radio-frequency electric field. As a result, in both of the front-stage ion transport unit and the rear-stage ion transport unit, a high ion transmission efficiency can be achieved.

In the ion transport apparatus according to the present invention, for example, ions originating from a sample component generated in the atmospheric pressure ion source are introduced into the front-stage ion transport unit along the first ion beam axis, together with a gas stream. As aforementioned, ions whose energy is reduced due to the collision with gas are trapped in the radio-frequency electric field created by the front-stage ion transport unit and transported while being focused in the vicinity of the first ion beam axis. When the ions are emitted from the outlet of the front-stage ion transport unit, the ions next enter the direct-current electric field created by the ion deflector. Since ions are electrically charged, they receive force by this direct-current electric field to bend their traveling direction, and reach the ion receiving range at the inlet end of the rear-stage ion transport unit. Then, the ions are trapped by the radio-frequency electric field created by the rear-stage ion transport unit, and transported while being focused in the vicinity of the second ion beam axis.

On the other hand, neutral particles unaffected by the force by the electric field in the ion deflector continue to travel in the same direction as that when entering the front-stage ion transport unit, that is, mainly along the first ion beam axis. In other words, the ions and the neutral particles are separated from each other in the ion deflector, and the neutral particles remain traveling straight ahead. Thus, the neutral particles do not reach the inlet end of the rear-stage ion transport unit or do not travel along the second ion beam axis not lying on the line of the first ion beam axis, and are eliminated by evacuation or the like.

Here, the front-stage ion transport unit and the rear-stage ion transport unit may have the same structure and the same applied voltage, or they may have different structures. They may have the same structure and different applied voltages. In any case, as these ion transport units, conventional and typical ion transport optical systems that transport ions while focusing the ions along a linear ion beam axis can be used. The ion deflector deflects ions by the effect of a direct-current electric field, so that it may have configuration including at least a pair of (i.e., two) plate electrodes and applying a direct-current voltage having potential differences to the pair of plate electrodes.

Therefore, in the ion transport apparatus according to the present invention, it is possible to achieve a high ion transmission efficiency with a simple structure and configuration without using electrodes having a special shape or structure or using ion transport optical systems having a complicated condition of applied voltages, and to reliably remove undesired neutral particles. By making the disposition so that the neutral particles traveling straight ahead in the ion deflector do not strike portions of the electrodes of the rear-stage ion transport unit facing ions being transported, it is possible to avoid substantial contamination (i.e., such contamination that have an adverse effect in focusing or transporting ions) of the rear-stage ion transport unit due to the neutral particles.

In the ion transport apparatus according to the present invention, the aforementioned multipole ion guide including a quadrupole ion guide, a multipole array ion guide in which rod electrodes are replaced with virtual rod electrodes each of which consists of plate electrodes, an ion funnel, or a radio-frequency carpet can be used for at least one of the front-stage ion transport unit and the rear-stage ion transport unit. From viewpoint of simplifying the structure and configuration, it is suitable to use quadrupole ion guides for both of the front-stage ion transport unit and the rear-stage ion transport unit.

As one specific form of the ion transport apparatus according to the present invention, the first ion beam axis and the second ion beam axis may be disposed in parallel. In this configuration, in order to deflect ions, it is desirable to create the direct-current electric field so that force acts on the ions in a direction orthogonal to a direction along the first ion beam axis. Thus, in the ion transport apparatus according to this specific form, the above-described ion deflector may have a configuration including parallel flat electrodes in such a manner as to be orthogonal to a plane including the first ion beam axis and the second ion beam axis. This enables the ions to be appropriately deflected with a simple structure and configuration.

In the ion transport apparatus according to the present invention, the rear-stage ion transport unit may be disposed to be off the extended line of the first ion beam axis. In this configuration, neutral particles traveling straight ahead in the ion deflector do not directly strike the rear-stage ion transport unit, which allows the contamination of the electrodes of the rear-stage ion transport unit to be reliably avoided.

A mass spectrometer in a first specific form according to the present invention is a mass spectrometer including the ion transport apparatus according to the above-described present invention, the mass spectrometer further including n intermediate vacuum chambers (n is an integer equal to or more than one) disposed between an ionization chamber and an analysis chamber and having degrees of vacuum in an ascending order, the ionization chamber being for ionizing a sample component under a substantially atmospheric pressure, the analysis chamber including a mass separating unit for separating ions in accordance with a mass-to-charge ratio and maintained at a high degree of vacuum, wherein the ion transport apparatus is disposed inside a first intermediate vacuum chamber next to the ionization chamber.

In the mass spectrometer according to the invention, the central axis of the ion introduction unit for sending ions from the ionization chamber to the first intermediate vacuum chamber is located on a line of the above-described first ion beam axis, and the central axis of an ion passage opening for sending ions from the first intermediate vacuum chamber to a next second intermediate vacuum chamber or the analysis chamber is located on a line of the above-described second ion beam axis.

As aforementioned, the inside of the first intermediate vacuum chamber having a low degree of vacuum (e.g., about 100 Pa) due to gas flowing from the ionization chamber, and thus the cooling effect of ions by the collision with the gas works sufficiently. Thus, ions are easily trapped in the front-stage ion transport unit and the rear-stage ion transport unit, giving an advantage in achieving a high ion transmission efficiency.

The above-described ion transport apparatus according to the present invention can be used in a collision cell for dissociating ions originating from a sample component (precursor ions) by collision-induced dissociation to transport the precursor ions or product ions, for example, in a tandem quadrupole mass spectrometer, a quadrupole time-of-flight (Q-TOF) mass spectrometer, or the like.

A mass spectrometer according to a second specific form according to the present invention is a mass spectrometer including the ion transport apparatus according to the above-described the present invention, the mass spectrometer including a first mass separation unit for selecting ions having a specific mass-to-charge ratio from among ions originating from a sample component, a collision cell for dissociating the ions selected by the first mass separation unit, and a second mass separation unit for separating ions generated by the dissociation in the collision cell in accordance with a mass-to-charge ratio, wherein the ion transport apparatus is placed within the collision cell.

Here, the first mass separation unit is typically a quadrupole mass filter, and the second mass separation unit is typically a quadrupole mass filter or a time-of-flight (TOF) mass analyser.

For example, as described in Patent Literature 4, in a GC-MS using the combination of a gas chromatograph and a mass spectrometer, when a noble gas such as helium (He) used as a carrier gas in the gas chromatograph is introduced into an ion source using electron ionization, the noble gas receives energy in the ion source and easily becomes metastable atoms (or molecules). Such metastable atoms are of a kind of neutral particle, and when being introduced into the first mass separation unit, the metastable atoms pass through the mass separation unit without being removed, and enter the collision cell together with precursor ions.

In the mass spectrometer according to the second specific form according to the present invention, the aforementioned ion transport apparatus of off-axis structure according to the present invention is installed in the collision cell whose gas pressure becomes relatively high, as compared with the outside space, by the introduction of collision-induced dissociation gas. Thus, the traveling direction of precursor ions emitted from the first mass separation unit and introduced into the collision cell and the traveling direction of product ions emitted from the collision cell and introduced into the second mass separation unit are non-linear. Thus, the metastable atoms of the noble gas (especially, helium) entering the collision cell together with the precursor ions are separated from the precursor ions or the product ions and removed in the collision cell. Therefore, it is possible to prevent such metastable atoms from being introduced into the second mass separation unit or passing through the mass separation unit to reach the ion detector. It is thereby possible to reduce noise due to these metastable atoms.

In order only to remove neutral particles such as metastable atoms, an apparatus that has the first ion beam axis and the second ion beam axis in parallel to each other may be used as the ion transport apparatus. However, it is more preferable to use, rather than such a configuration, an ion transport apparatus in which the first ion beam axis and the second ion beam axis intersect with each other. In the mass spectrometer according to the second specific form including the ion transport apparatus according to the present invention having such a configuration, across the collision cell the first mass separation unit and the second mass separation unit can be disposed to be non-linear, that is, to be on an oblique or right-angle lines. In general, when the first mass separation unit, the collision cell, and the second mass separation unit are disposed to be in a straight line, it is inevitable that the external size of the apparatus is significantly increased. However, in the mass spectrometer according to the second specific form according to the present invention having the above-described configuration, it is possible to flexibly determine the relative disposition between the first mass separation unit and the second mass separation unit to make the external size of the apparatus smaller.

Advantageous Effects of Invention

According to the ion transport apparatus according to the present invention, it is possible to achieve a high ion transmission efficiency with a simple structure and configuration without using electrodes having a special shape or structure or using ion transport optical systems having a complicated condition of applied voltages, while reliably removing undesired neutral particles. Thereby, it is possible to provide an off-axis structure ion transport apparatus that reduces cost in production and has a high maintainability.

According to the mass spectrometers according to the first specific form and the second specific form according to the present invention, the sensitivity of the analysis can be improved by increasing the amount of ions to be subjected to the mass spectrometry, while eliminating unnecessary neutral particles and suppressing noise. Furthermore, especially, the mass spectrometer according to the second specific form according to the present invention has an advantage in downsizing the apparatus.

DESCRIPTION OF EMBODIMENTS

Several embodiments of an ion transport apparatus according to the present invention as well as a mass spectrometer using this ion transport apparatus are described with reference to the attached drawings.

First Embodiment

Figure 1:
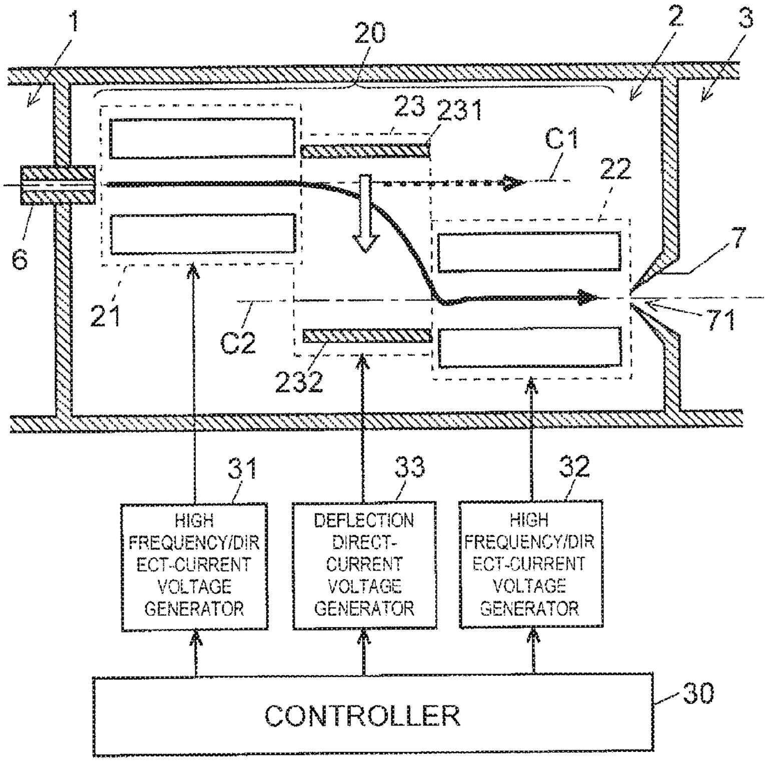
FIG. 1 is a schematic configuration diagram of an ion transport optical system of a first embodiment of an ion transport apparatus according to the present invention.
Figure 2:
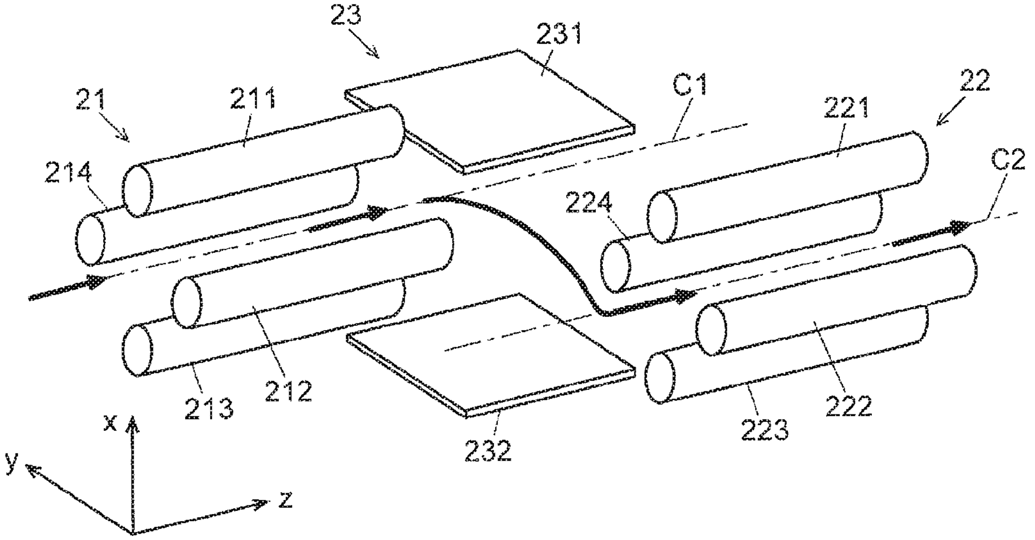
FIG. 2 is a schematic perspective view of an electrode unit of the ion transport optical system in the first embodiment.

An atmospheric pressure ionization mass spectrometer, which is a mass spectrometer using one embodiment (a first embodiment) of an ion transport apparatus according to the present invention, is described. FIG. 1 is a schematic configuration diagram of an ion transport optical system in the first embodiment, FIG. 2 is a schematic perspective view of an electrode unit of the ion transport optical system in the first embodiment, and FIG. 3 is a schematic configuration diagram of an atmospheric pressure ionization mass spectrometer using the ion transport optical system in the first embodiment.

Figure 3:
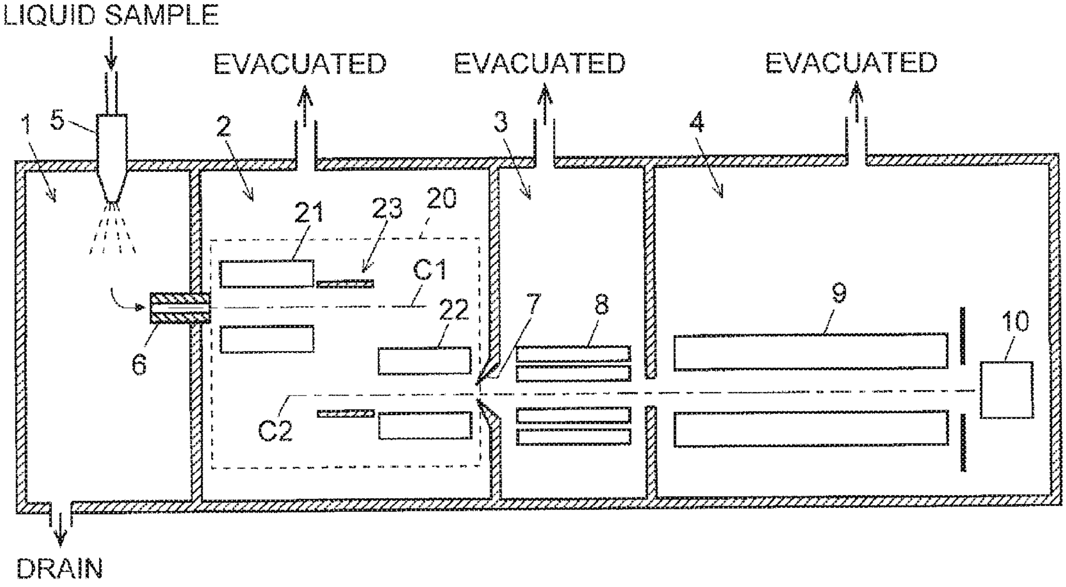
FIG. 3 is a schematic configuration diagram of an atmospheric pressure ionization mass spectrometer using the ion transport optical system in the first embodiment.

In FIG. 3, an ionization chamber 1 is maintained at a substantially atmospheric pressure, and an analysis chamber 4 is maintained at a high degree of vacuum by evacuation using a high-performance vacuum pump (normally, a combination of a turbo-molecular pump and a rotary pump), which is not illustrated. Between the ionization chamber 1 and the analysis chamber 4, a first intermediate vacuum chamber 2 maintained at a low degree of vacuum, and a second intermediate vacuum chamber 3 maintained at a degree of vacuum between those of the first intermediate vacuum chamber 2 and the analysis chamber 4, are provided. In other words, this mass spectrometer has the structure of a multistage differential pumping system in which the degree of vacuum is increased in a stepwise manner in the traveling direction of ions from the ionization chamber 1.

Within the ionization chamber 1, a liquid sample containing a sample component is sprayed from an electrospray nozzle 5 while the sample component is subjected to biased electric charges from this nozzle. The sprayed droplets with electric charges come in contact with the ambient air and become even smaller droplets, and in the process of the vaporization of the solvent, sample component molecules leave with electric charges to be ionized. It is also possible to adopt a different atmospheric pressure ionization technique instead of the electrospray ionization (ESI) described here, such as the atmospheric pressure chemical ionization (APCI), and atmospheric pressure photoionization (APPI).

The ionization chamber 1 communicates with the first intermediate vacuum chamber 2 through a thin heated capillary 6. Mainly due to the pressure difference between the two open ends of this capillary 6, ions originating from the sample component produced within the ionization chamber 1 are drawn into the heated capillary 6. Then, the ions are ejected into the first intermediate vacuum chamber 2 together with gas stream from the outlet end of the heated capillary 6. In a partition wall that separates the first intermediate vacuum chamber 2 and the second intermediate vacuum chamber 3, a skimmer 7 having a small-diameter orifice 71 at its apex is provided. Within the first intermediate vacuum chamber 2, an off-axis ion transport optical system 20 having a characteristic configuration to be described later. Ions introduced into the first intermediate vacuum chamber 2 are guided to the orifice 71 of the skimmer 7 by this off-axis ion transport optical system 20 and sent through the orifice 71 to the second intermediate vacuum chamber 3.

Within the second intermediate vacuum chamber 3, a multipole (e.g., octupole) ion guide 8 is arranged. Owing to the effect of a radio-frequency electric field created by the ion guide 8, ions are focused and sent to the analysis chamber 4. Within the analysis chamber 4, the ions are introduced into the space extending along the longitudinal axis of a quadrupole mass filter 9. Owing to the effect of an electric field created by the radio-frequency voltage and the direct-current voltage applied to the quadrupole mass filter 9, only ions having a specific mass-to-charge ratio pass through the quadrupole mass filter 9 and reach an ion detector 10. The ion detector 10 generates a detection signal corresponding to the amount of ions reached, and sends the signal to a data processor, which is not illustrated. By allowing only the target ions among the ions derived from the sample component within the ionization chamber 1 to reach the ion detector 10 while suppressing the loss of the target ions as much as possible, the mass spectrometry with high sensitivity can be achieved.

The off-axis ion transport optical system arranged within the first intermediate vacuum chamber 2 is hereinafter described in detail.

This off-axis ion transport optical system 20 includes a front-stage quadrupole ion guide 21 in which four columnar-shaped rod electrodes 211, 212, 213, and 214 are disposed in a rotationally symmetric manner around a linear first ion beam axis C1, and a rear-stage quadrupole ion guide 22 in which four columnar-shaped rod electrodes 221, 222, 223, and 224 are disposed in a rotationally symmetric manner around a linear second ion beam axis C2 that does not lie on the extended line of the first ion beam axis C1 but is parallel to the ion beam axis C1. The front-stage quadrupole ion guide 21 is disposed immediately behind the outlet end of the heated capillary 6. The central axis of the outlet of the heated capillary 6 lies on a straight line with the first ion beam axis C1. The rear-stage quadrupole ion guide 22 is disposed directly in front of the skimmer 7. The central axis of the orifice 71 lies on a straight line with the second ion beam axis C2.

In the space between the front-stage quadrupole ion guide 21 and the rear-stage quadrupole ion guide 22, an ion deflector 23 is disposed that deflects the traveling direction of ions. The ion deflector 23 includes a pair of parallel flat electrodes 231 and 232 orthogonal to a plane including the first ion beam axis C1 and the second ion beam axis C2 (the x-z plane in this embodiment) and provided being separated from each other in the X direction so as to sandwich both the ion beam axes C1 and C2.

A first radio-frequency/direct-current voltage generator 31 applies high-frequency voltages +V1 cos ωt having the same amplitude, frequency, and phase to two rod electrodes 211 and 213 out of the four rod electrodes 211 to 214 of the front-stage quadrupole ion guide 21, the two rod electrodes 211 and 213 facing each other across the first ion beam axis C1, and applies, to the other two rod electrodes 212 and 214 adjacent to these rod electrodes 211 and 213 in a circumferential direction, high-frequency voltages −V1 cos ωt having the same amplitude and phase, and having a phase inverted (i.e., different by 180 degrees) from that of +V1 cos ω. In addition to the above-described high-frequency voltages, the first radio-frequency/direct-current voltage generator 31 applies a predetermined direct-current bias voltage VDC1 to the four rod electrodes 211 to 214 in common.

A second radio-frequency/direct-current voltage generator 32 applies high-frequency voltages +V2 cos ω2t having the same amplitude, frequency, and phase to two rod electrodes 221 and 223 out of the four rod electrodes 221 to 224 of the rear-stage quadrupole ion guide 22, the two rod electrodes 221 and 223 facing each other across the second ion beam axis C2, and applies, to the other two rod electrodes 222 and 224 adjacent to these rod electrodes 221 and 223 in a circumferential direction, high-frequency voltages −V2 cos ω2t having the same amplitude and phase, and having a phase inverted from +V2 cos ω2t. In addition to the above-described high-frequency voltages, the second radio-frequency/direct-current voltage generator 32 applies a predetermined direct-current bias voltage VDC2 to the four rod electrodes 221 to 224 in common.

A deflection direct-current voltage generator 33 applies predetermined direct-current voltages to the pair of parallel flat electrodes 231 and 232, respectively.

All of these voltage generators 31, 32, and 33 generate the respective voltages under control by the controlling unit 30.

In the front-stage and rear-stage quadrupole ion guides 21 and 22, the high-frequency voltages applied to the rod electrodes 211 to 214 and 221 to 224 create quadrupole radio-frequency electric fields in spaces surrounded by these rod electrodes 211 to 214 and 221 to 224, respectively. Owing to the effects of these radio-frequency electric fields, introduced ions are captured within predetermined ranges around the ion beam axes C1 and C2 while oscillating with the ion beam axes C1 and C2 as a center. If the ions have excessive energies, the ions are hard to be captured within the radio-frequency electric fields. However, the first intermediate vacuum chamber 2 is in a low vacuum state, and the ions have many opportunities to come into contact with residual gas. Therefore, the energies of the ions are easily reduced by the cooling effect made by contact with the residual gas, and thus the ions are efficiently captured within the radio-frequency electric fields. The ions introduced into the front-stage and rear-stage quadrupole ion guides 21 and 22 with a predetermined energy travel while being focused around the ion beam axes C1 and C2.

The ions ejected from the outlet end of the heated capillary 6 together with the gas travel while spreading out, but many of them enter the ion receiving range on the inlet side of the front-stage quadrupole ion guide 21. The ions are thus efficiently captured within the radio-frequency electric field of the front-stage quadrupole ion guide 21, and travel along the first ion beam axis C1 to be emitted from the outlet end of the front-stage quadrupole ion guide 21. Immediately afterward, these emitted ions receive force by a direct-current deflecting electric field created between the parallel flat electrodes 231 and 232. This force acts in the direction illustrated by the white thick arrow in FIG. 1 (in the negative direction of the X axis in FIG. 2). The traveling direction of the ions thereby gradually bends as illustrated bold solid lines in FIG. 1 and FIG. 2. In the direct-current deflecting electric field, no focusing action acts on the ions, and thus the ions spread out as traveling. However, many of them enter the ion receiving range on the inlet side of the rear-stage quadrupole ion guide 22. The ions are thus efficiently captured within the radio-frequency electric field of the rear-stage quadrupole ion guide 22.

Into the front-stage quadrupole ion guide 21, various kinds of non-ionized molecules and neutral particles such as metastable molecules are injected together with the ions. These neutral particles are not affected by the radio-frequency electric field and thus travel almost straight ahead through the internal space of the front-stage quadrupole ion guide 21. Many of the neutral particles thus travel straight ahead in the vicinity of the first ion beam axis C1 and are injected into a space between the parallel flat electrodes 231 and 232 of the ion deflector 23. The neutral particles are not affected by the direct-current deflecting electric field either and thus pass almost straight ahead outside the rear-stage quadrupole ion guide 22. Therefore, in the ion deflector 23, the neutral particles are separated from the ions and mostly discharged from the first intermediate vacuum chamber 2 with the residual gas. In such a manner, various neutral particles, which are to be a cause of noise, introduced together with the ions are eliminated in the first intermediate vacuum chamber 2.

The ions captured in the radio-frequency electric field of the rear-stage quadrupole ion guide 22 with their traveling direction changed into a direction along the second ion beam axis C2, and are emitted from the outlet end of the rear-stage quadrupole ion guide 22 while being focused around the second ion beam axis C2. Then, the ions pass through the orifice 71 to be sent to the second intermediate vacuum chamber 3.

In such a manner, in this off-axis ion transport optical system, with a combination of a quadrupole ion guide and parallel flat electrodes, all of which are simply structured, it is possible to efficiently guide target ions originating from a sample component and send them to the rear stage while reliably eliminating neutral particles.

In this off-axis ion transport optical system in the first embodiment, the front-stage and rear-stage quadrupole ion guides 21 and 22 can be replaced with different multipole ion guides, such as an octupole ion guide, having different number of rod electrodes. In terms of performance, the quadrupole ion guides having a small number of electrodes sufficiently achieve the effect, and a small number of electrodes advantageously reduce the cost. As will be described later, the ion deflector 23 may be any electrodes other than the parallel flat electrodes. However, the parallel flat electrodes have a simple structure and a simple condition of applied voltage, which also advantageously reduces the cost.

Second Embodiment

Figure 4:
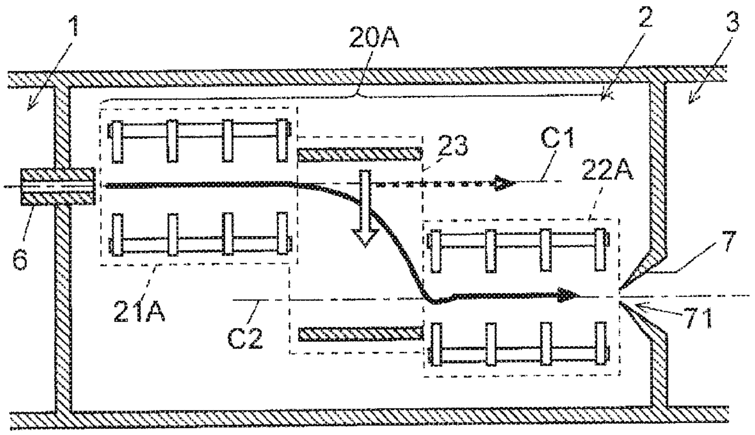
FIG. 4 is a schematic configuration diagram of an ion transport optical system of a second embodiment of the ion transport apparatus according to the present invention.
Figure 5:
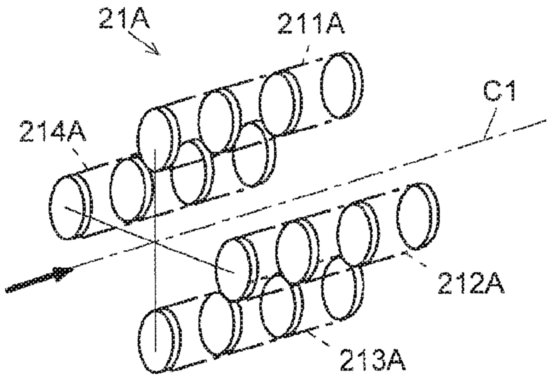
FIG. 5 is a schematic perspective view of an electrode unit of a quadrupole array ion guide used in the ion transport optical system in the second embodiment.

In place of the front-stage and rear-stage quadrupole ion guides 21 and 22 in the off-axis ion transport optical system in the first embodiment, quadrupole array ion guides having rod electrodes replaced with virtual rod electrodes consisting of plate electrodes, or multipole array ion guides other than quadrupole ones can be used. FIG. 4 illustrates the schematic configuration of an off-axis ion transport optical system 20A in a second embodiment using quadrupole array ion guides. FIG. 5 is a schematic perspective view of an electrode unit of a quadrupole array ion guide. In FIG. 4, the same components as those of the off-axis ion transport optical system in the first embodiment are denoted by the same reference signs.

In the second embodiment, a front-stage quadrupole array ion guide 21A and a rear-stage quadrupole array ion guide 22A both include virtual rod electrodes each of which consists of four disk-shaped electrodes. In FIG. 5, four virtual rod electrodes 211A, 212A, 213A, and 214A disposed around a first ion beam axis are each composed of four disk-shaped electrodes. By applying the same high-frequency voltages to the four disk-shaped electrodes included in one virtual rod electrode, it is possible to create a radio-frequency electric field almost the same as that in the quadrupole ion guide 21 or 22 in the first embodiment, in the space surrounded by the four virtual rod electrodes. Therefore, the motion of ions injected into the front-stage and rear-stage quadrupole array ion guides 21A and 22A are almost the same as in the case of the first embodiment. Thus, the traveling direction of ions transported by the front-stage quadrupole array ion guide 21A bends in the ion deflector 23 to reach the ion receiving range at the inlet of the rear-stage quadrupole array ion guide 22A, and is transported in the rear-stage quadrupole array ion guide 22A while being focused. Additionally, the motion of neutral particles is almost the same as in the case of the first embodiment.

Figure 6A:
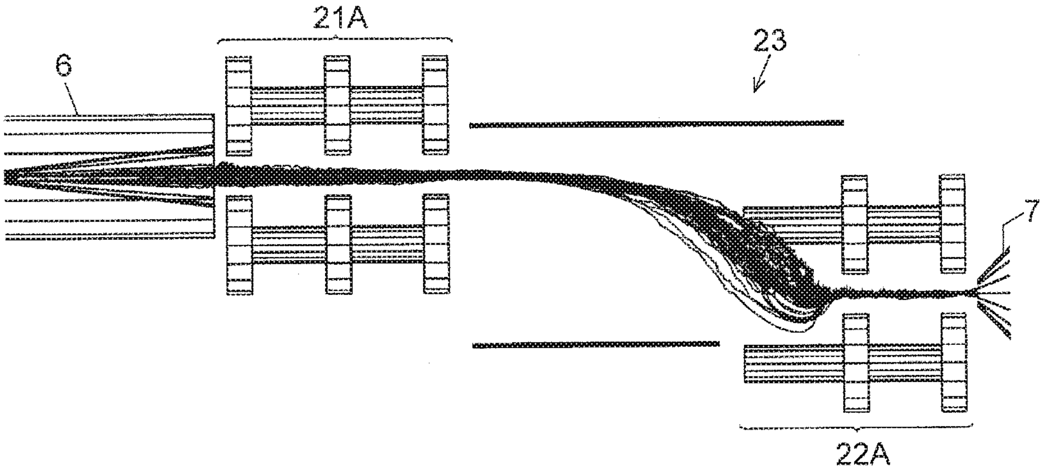
FIG. 6A and FIG. 6B are diagrams illustrating the result of ion path simulation calculation for the ion transport optical system of the second embodiment.
Figure 6B:
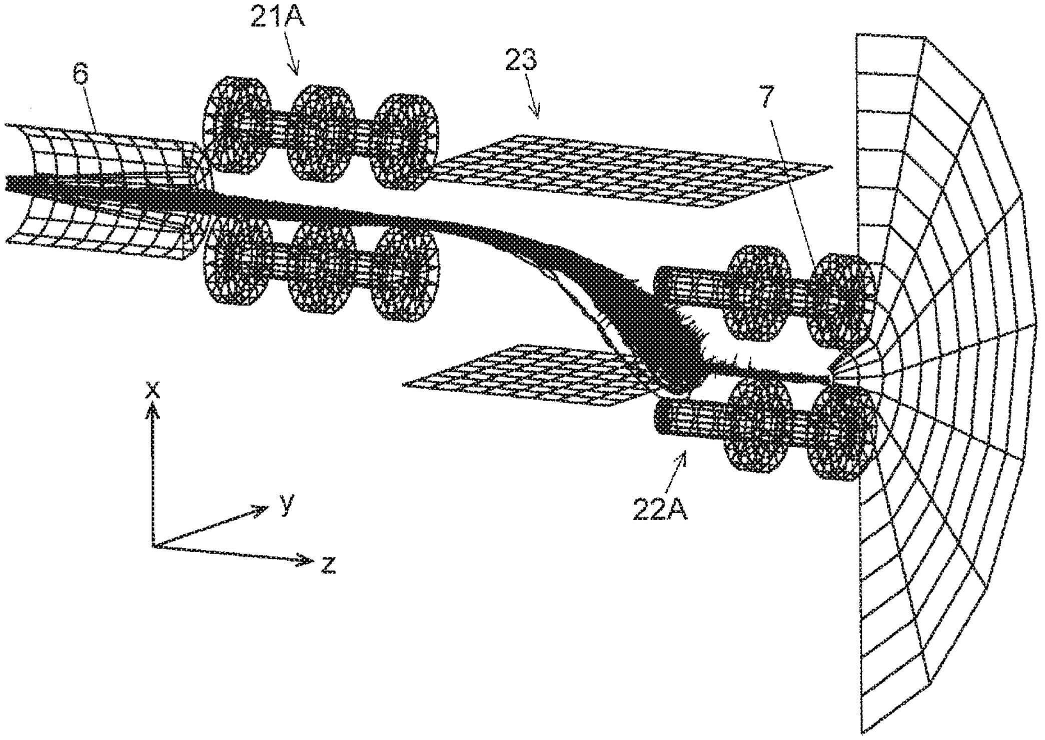

Now, an ion path simulation performed to verify the effect of the ion transport apparatus according to the present invention is described. FIG. 6A is a plan view of the result of the ion path simulation for the off-axis ion transport optical system 20A in the second embodiment, and FIG. 6B is a perspective view of the result. It is assumed here that the quadrupole array ion guides 21A and 22A each include virtual rod electrodes each of which consists of three disk-shaped electrodes. Additionally, of the parallel flat electrodes constructing the ion deflector 23, the flat electrode 231 on the upper side is longer than the flat electrode 232 on the lower side and extends toward the rear-stage quadrupole array ion guide 22A so that the front part of the rear-stage quadrupole array ion guide 22A is covered with the flat electrode 231. In FIG. 6A and FIG. 6B, to avoid making the ion paths difficult to understand, some of the virtual rod electrodes and the disk-shaped electrodes are not illustrated, but of course, these components are factored into the calculation of the simulation.

The high-frequency voltage applied to the virtual rod electrodes of the front-stage and rear-stage quadrupole array ion guides 21A and 22A has an amplitude of 150 [V] and a frequency of 800 [kHz]. The deflection direct-current voltage has a value appropriately adjusted so that an ion transmission efficiency becomes best. Referring to the ion paths illustrated in FIG. 6A and FIG. 6B, it is confirmed that the ions transported by the front-stage quadrupole array ion guide 21A are deflected by the ion deflector 23 so as to travel toward the rear-stage quadrupole array ion guide 22A, and are captured and focused in the rear-stage quadrupole array ion guide 22A. The calculation from this paths simulation shows an ion transmission efficiency of about 98%, thereby confirming that it is possible to implement an off-axis-structure ion transport apparatus that gives a high ion transmission efficiency while having a simple structure.

Although this result of the simulation based on the off-axis ion transport optical system 204 in the second embodiment, it is clear for the previously-described reason that the off-axis ion transport optical system 20 in the second embodiment can give almost the same ion transmission efficiency.

In the above-described first and second embodiments, quadrupole ion guides and quadrupole array ion guides are used as ion transport units using radio-frequency electric fields in order to simplify the electrode structures and the applied voltage conditions. As these ion transport units, a conventionally known ion funnel, radio-frequency carpet, or the like can be used. Hereinafter, embodiments using such configurations are described.

Third Embodiment

Figure 7:
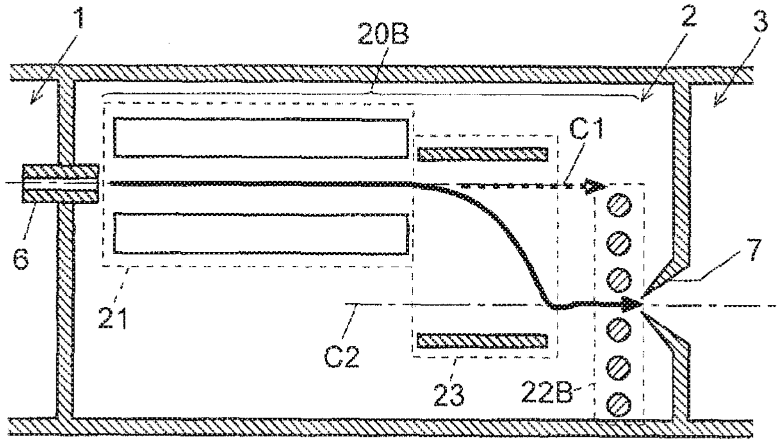
FIG. 7 is a schematic configuration diagram of an ion transport optical system of a third embodiment of the ion transport apparatus according to the present invention.
Figure 8:
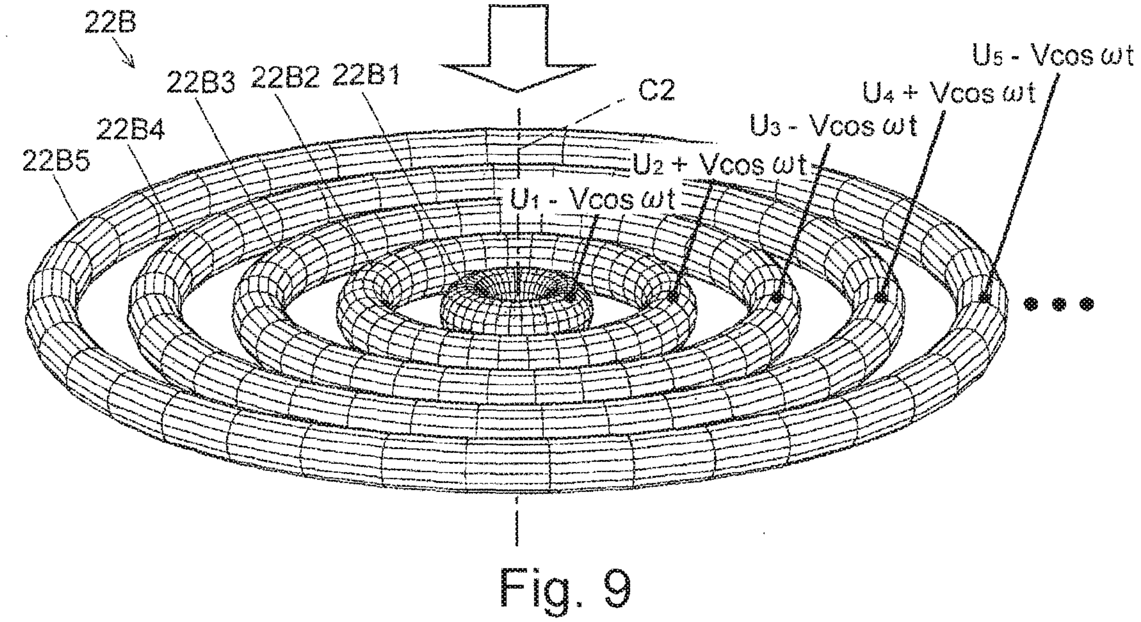
FIG. 8 is a schematic perspective view of an electrode unit of a radio-frequency carpet used in the ion transport optical system in the third embodiment.

FIG. 7 is a schematic configuration diagram of an off-axis ion transport optical system 20B in a third embodiment. In this embodiment, a quadrupole ion guide 21 is used as a front-stage ion transport unit, and a radio-frequency carpet 22B is used as a rear-stage ion transport unit. FIG. 8 is a schematic perspective view of an electrode unit of this radio-frequency carpet 22B.

The radio-frequency carpet 22B is composed of a number of (five in this embodiment) ring electrodes 22B1, 22B2, 22B3, 22B4, and 22B5 disposed concentrically. High-frequency voltages +V cos ωt and −V cos ωt are applied to the ring electrodes neighboring each other in a radial direction, for example, to the ring electrodes 22B1 and 22B2, respectively, where the high-frequency voltages +V cos ωt and −V cos ωt have the same amplitude and frequency but have phases inverted from each other. Specifically, +V cos ωt is applied to some of the ring electrodes alternately positioned in the radial direction (the ring electrodes 22B2 and 22B4 in the example illustrated in FIG. 8), and −V cos ωt is applied to the others (the ring electrodes 22B1, 22B3, and 22B5 in the example illustrated in FIG. 8). A radio-frequency electric field created by the high-frequency voltages applied to the ring electrodes 22B1 to 22B5 in such a manner has an effect of capturing ions in the vicinities of locations fittingly separated from the ring electrodes 22B1 to 22B5.

Additionally, different levels of direct-current voltages U1, U2, . . . are applied to the ring electrodes 22B1 . . . , respectively. These direct-current voltages U1, U2, . . . are determined so as to create a potential which is sloped downward from the outer ring electrode toward the inner ring electrode. The upward or downward slope should be determined depending on the polarity of the ions concerned. Therefore, the polarity of the direct-current voltages U1, U2, . . . are changed depending on the polarity of the ions to be analyzed. Ions located within a certain distance from the surfaces of the ring electrodes 22B1 to 22B5 by the effect of the radio-frequency electric field are affected by the aforementioned direct-current electric field showing the potential having the downward gradient, and thereby move along the gradient of that potential. As a result, the ions move from the outer circumference side to the inner circumference side of the radio-frequency carpet 22B, that is, come closer to the second ion beam axis C2.

In the off-axis ion transport optical system 20B in the third embodiment, as in the above-described embodiments, ions deflected in the ion deflector 23 by the effect of the direct-current deflecting electric field are collected by the radio-frequency carpet 22B, focused in the vicinity of the second ion beam axis C2, and finally sent out from the orifice 71. In general, a radio-frequency carpet has a wider ion receiving range than the multipole ion guide or the like. Thus, even when an ion stream spreads out to some extent in the ion deflector 23 without the effect of focusing ions, it is possible to efficiently collect and transport the ions by the radio-frequency carpet 22B.

As the radio-frequency carpet 22B, one having a configuration described in Patent Literature 2 can be used, and it is more preferable to use a radio-frequency carpet described in PCT/JP2003/066564 filed by the applicant of the present application.

Fourth Embodiment

Figure 9:
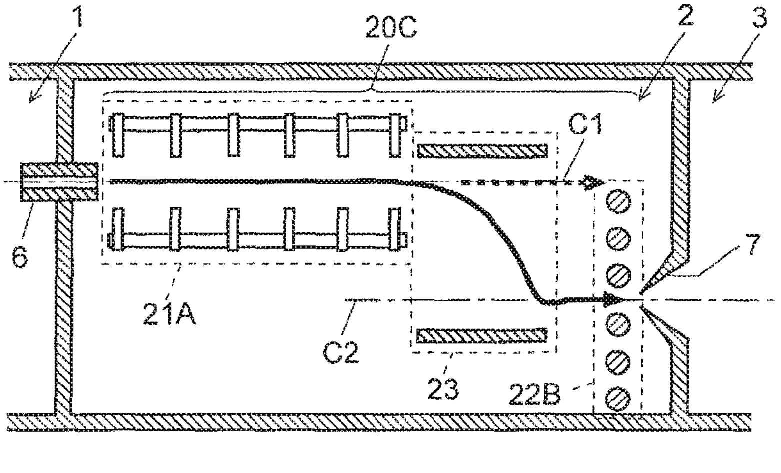
FIG. 9 is a schematic configuration diagram of an ion transport optical system of a fourth embodiment of the ion transport apparatus according to the present invention.

FIG. 9 is a schematic configuration diagram of an off-axis ion transport optical system 20C in a fourth embodiment. In this embodiment, the front-stage quadrupole ion guide 21 in the off-axis ion transport optical system 20B in the third embodiment is replaced with the quadrupole array ion guide 21A used in the second embodiment. Clearly, this configuration also achieves the same effect as that in the above-described embodiments.

Fifth Embodiment

Figure 10:
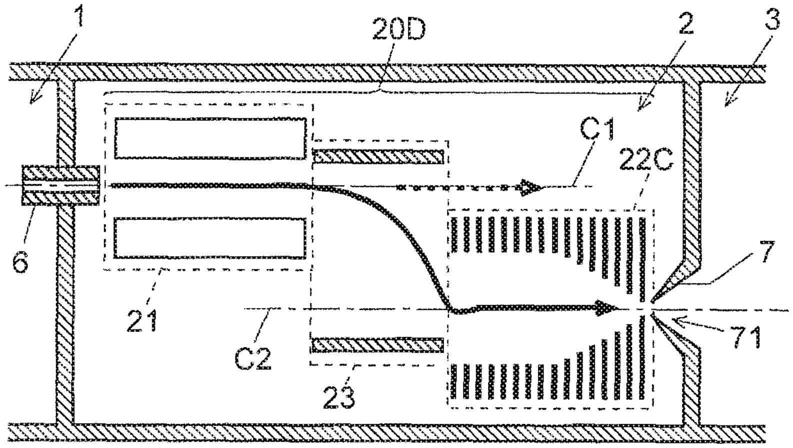
FIG. 10 is a schematic configuration diagram of an ion transport optical system of a fifth embodiment of the ion transport apparatus according to the present invention.

FIG. 10 is a schematic configuration diagram of an off-axis ion transport optical system 20D in a fifth embodiment. In this embodiment, the quadrupole ion guide 21 is used as a front-stage ion transport unit, and a typical ion funnel 22C described in Patent Literature 1 and the like is used as a rear-stage ion transport unit. As is well known, the ion funnel can efficiently focus introduced ions in such a manner as to narrow the ion stream to the vicinity of its central axis. Therefore, it is clear that this configuration also achieves the same effect as that in the above-described embodiments.

Sixth Embodiment

Figure 11:
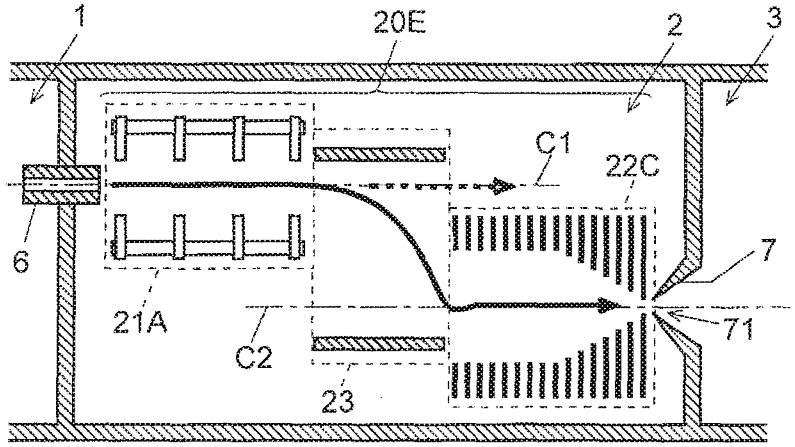
FIG. 11 is a schematic configuration diagram of an ion transport optical system of a sixth embodiment of the ion transport apparatus according to the present invention.

FIG. 11 is a schematic configuration diagram of an off-axis ion transport optical system 20E in a sixth embodiment. In this embodiment, the quadrupole array ion guide 21A is used as a front-stage ion transport unit, and as in the fifth embodiment, the ion funnel 22C is used as a rear-stage ion transport unit. It is clear that this configuration also achieves the same effect as that in the above-described embodiments.

Seventh Embodiment

Figure 12:
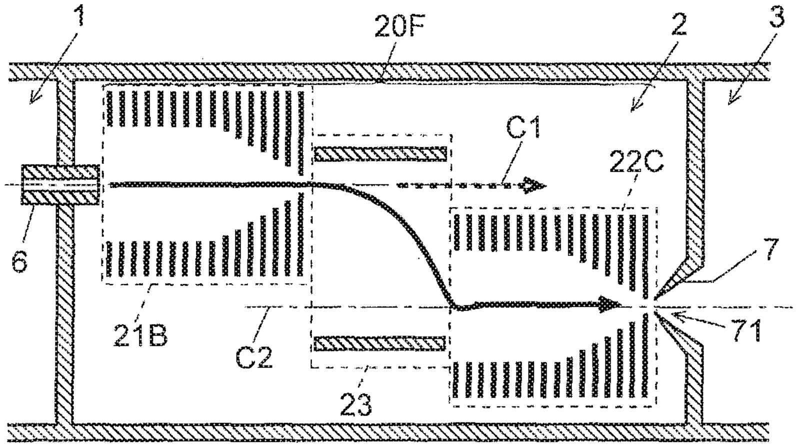
FIG. 12 is a schematic configuration diagram of an ion transport optical system of a seventh embodiment of the ion transport apparatus according to the present invention.

FIG. 12 is a schematic configuration diagram of an off-axis ion transport optical system 20F in a seventh embodiment. In this embodiment, an ion funnel 21B and the ion funnel 22C are used as the front-stage and rear-stage ion transport unit, respectively. It is clear that this configuration also achieves the same effect as that in the above-described embodiments.

As described in the above-described embodiments, as ion transport units respectively disposed in the front-stage and the rear stage across the ion deflector 23, any ion transport unit having various configurations can be used as long as the ion transport unit traps and transports ions using a radio-frequency electric field. Additionally, the ion deflector 23 is not limited to the aforementioned one using the simple pair of parallel flat electrodes 231 and 232.

Figure 13A:
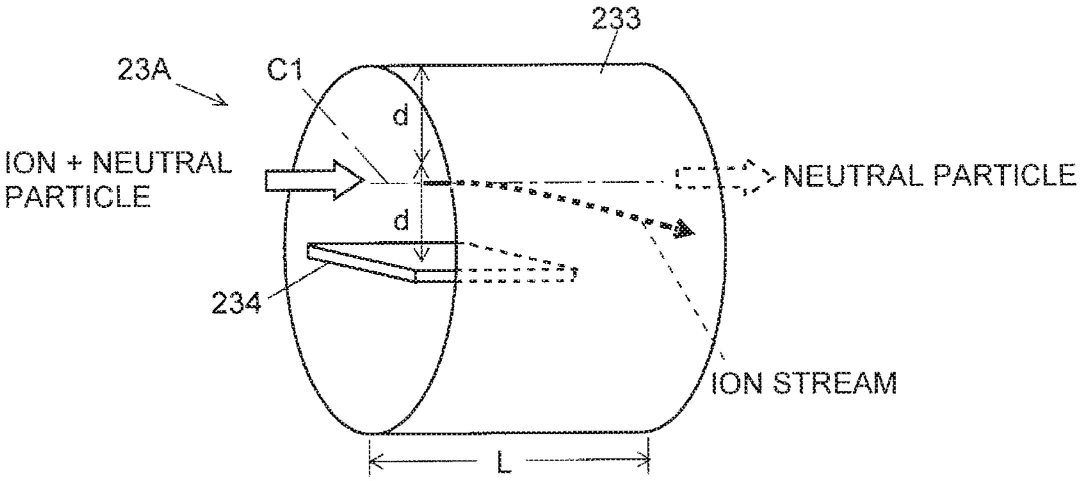
FIG. 13A and FIG. 13B are diagrams illustrating another configuration example of the ion deflector used in the ion transport optical systems in the first to seventh embodiments.
Figure 13B:
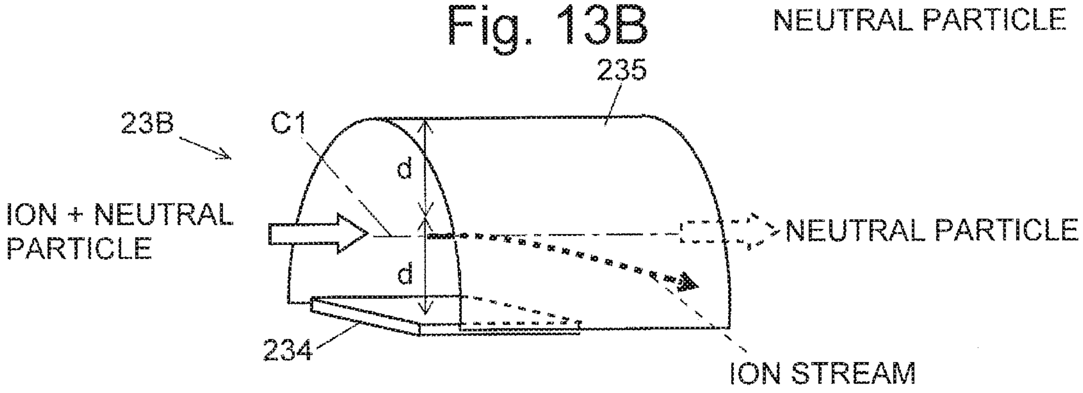

FIG. 13A and FIG. 13B are diagrams illustrating other configuration examples of the ion deflector used in the off-axis ion transport optical systems in the above-described embodiments. An ion deflector 23A illustrated in FIG. 13A includes a cylindrical outer electrode 233 and a flat-shaped inner electrode 234 disposed in the internal space of the outer electrode 233 being electrically insulated from (e.g., not being in contact with) the electrode 233. The inner electrode 234 is disposed so as to extend on the central axis of the outer electrode 233 and in parallel with the central axis. The insertion length of the inner electrode 234 into the internal space of the outer electrode 233 (a columnar-shaped space surrounded by the circumferential face and both open end faces of the outer electrode 233) may be from about ½ of the distance between the inner electrode 234 and the outer electrode 233 in the internal space (denoted by reference sign d in FIG. 13A) to about a length L of the outer electrode 233.

The outer electrode 233 and the inner electrode 234 are disposed so that the circumferential face of the outer electrode 233 is parallel to the first ion beam axis C1, and the first ion beam axis C1 is located midway between the inner circumferential surface of the outer electrode 233 and the inner electrode 234 (i.e., as illustrated in FIG. 13A, the distance from the first ion beam axis C1 to the inner circumferential surface of the outer electrode 233 and the distance from the first ion beam axis C1 to the inner electrode 234 are substantially the same as d). In place of the flat-shaped inner electrode 234, a rod-shaped electrode may be used.

The same direct-current voltage as that applied to the aforementioned pair of parallel flat electrodes 231 and 232 is applied to the outer electrode 233 and the inner electrode 234. This creates, in the space between the outer electrode 233 and the inner electrode 234, a direct-current electric field that deflects ions in a direction toward the inner electrode 234. Since the outer electrode 233 is cylindrical, the electric field created between the inner circumferential surface of the outer electrode 233 and the inner electrode 234 has the effect of pushing ions existing in the internal space of the outer electrode 233 in directions toward the central-axis of the outer electrode 233. Thus, ions being deflected and travelling are prevented from spreading out and focused around the central axis of the outer electrode 233. A gas stream containing neutral particles without electric charges is not affected by the electric field and travel straight ahead. Thus, the ions and the neutral particles are separated from each other, and the ions efficiently reach the ion receiving range of the rear-stage ion transport unit.

An ion deflector 239 illustrated in FIG. 13B includes a semi-cylindrical outer electrode 235 but is otherwise the same as the ion deflector 23A.

In all of the aforementioned off-axis ion transport optical systems in the first to seventh embodiments, the first ion beam axis C1 does not lie on a straight line with and is parallel to the second ion beam axis C2, but the first ion beam axis C1 and the second ion beam axis C2 are not necessarily parallel to each other and can be, for example, oblique or orthogonal to each other. Additionally, the first ion beam axis C1 and the second ion beam axis C2 do not necessarily intersect with each other (i.e., lie on the same plane), and the rear-stage ion transport unit may be disposed at a location that causes ions deflected by the ion deflector to reach the ion receiving range at the inlet of the rear-stage ion transport unit. One of advantages provided by disposing the first ion beam axis C1 and the second ion beam axis C2 so as not to intersect with each other or lie on the same plane in such a manner is to increase the flexibility of disposition of ion optical systems in front-stage and rear-stage rear stages across the off-axis ion transport optical system, whereby to downsize the apparatus.

Figure 14:
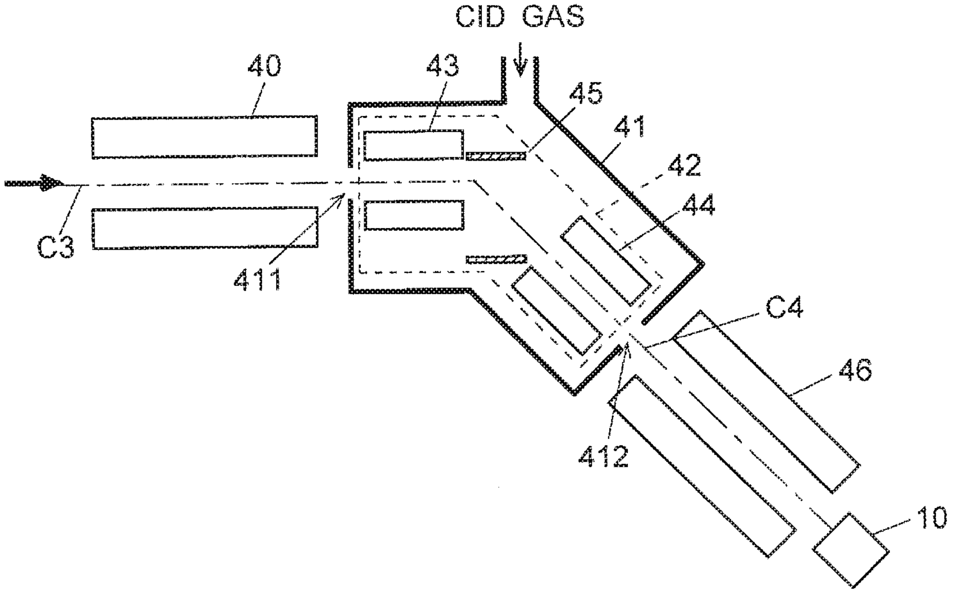
FIG. 14 is a schematic configuration diagram of an embodiment of a tandem quadrupole mass spectrometer including the ion transport apparatus according to the present invention.

As an example of such a mass spectrometer, an example in which an off-axis ion transport optical system of an embodiment of the present invention is applied to a tandem quadrupole mass spectrometer is described with reference to FIG. 14. FIG. 14 is a diagram illustrating the schematic configuration of an analysis chamber 4 maintained at a high degree of vacuum in the tandem quadrupole mass spectrometer.

Ions originating from a sample component are introduced into a front quadrupole mass filter 40 along a first ion beam axis C3. In accordance with voltage applied to the front quadrupole mass filter 40, only ions having a specific mass-to-charge ratio selectively pass through the front quadrupole mass filter 40 and enter the inside of a collision cell 41 disposed at the rear of the front quadrupole mass filter 40, through an ion entrance port 411 of the collision cell 41. In the collision cell 41, an off-axis ion transport optical system 42 including a front-stage quadrupole ion guide 43, a rear-stage quadrupole ion guide 44, and an ion deflector 45 is installed. In this off-axis ion transport optical system 42, as aforementioned, the first ion beam axis C3 on the entrance side and a second ion beam axis C4 on the emission side are not parallel to each other, but the ion beam axes C3 and C4 intersect with each other at a predetermined angle. By determining the positional relation between the ion deflector 45 and the rear-stage quadrupole ion guide 44 so that ions deflected in the ion deflector 45 reach the ion receiving range at the inlet of the rear-stage quadrupole ion guide 44, the deflected ions are efficiently collected in the rear-stage quadrupole ion guide 44.

Into the collision cell 41, a predetermined collision-induced dissociation (CID) gas such as argon is continuously or intermittently introduced. The ions having the specific mass-to-charge ratio and introduced into the collision cell 41, namely, precursor ions come into contact with the CID gas in the collision cell 41 to be cleaved, whereby product ions are generated. This cleavage is advanced as the precursor ions travel in the collision cell 41, and thus ions containing the precursor ions and the product ions are deflected in the ion deflector 45 and sent to the rear-stage quadrupole ion guide 44. The cleavage is advanced during such flight of the ions, and the product ions originating from the precursor ions are sent out through an ion emission port 412 of the collision cell 41.

These product ions are introduced into a rear quadrupole mass filter 46 disposed in the rear stage of the collision cell 41 along the second ion beam axis C4. In accordance with voltage applied to the rear quadrupole mass filter 46, only product ions having a specific mass-to-charge ratio selectively pass through the rear quadrupole mass filter 46 and reach the ion detector 10 to be detected.

For example, in the case where the tandem quadrupole mass spectrometer is used as a detector in a gas chromatograph, a noble gas such as helium used as a carrier gas in the gas chromatograph is introduced into an ion source. In this case, an ion source using electron ionization is often used, and the noble gas is easy to turn into a metastable atom (molecule) when receiving energy in the ion source. Thus, undesired metastable atoms generated in such a manner may be introduced into the collision cell 41 together with ions originating from a sample component. The metastable atoms are neutral particles and not affected by an electric field, and thus the ions (precursor ions, product ions) and the metastable atoms are separated from each other in the ion deflector 45, and the metastable atoms do not enter the rear quadrupole mass filter 46. This can avoid noise due to the metastable atom.

Typically, in a tandem quadrupole mass spectrometer, the front quadrupole mass filter 40, the collision cell 41, and the rear quadrupole mass filter 46 are disposed on a substantially straight line, and thus it is inevitable that the analysis chamber 4 is made significantly long. However, the configuration illustrated in FIG. 14 allows the analysis chamber 4 to be short by deflecting ions in the collision cell 41. It is thereby possible to downsize the external shape of the apparatus as a whole, and for example, it is possible to reduce an installation space for the apparatus.

Of course, an off-axis ion transport optical system installed in the collision cell 41 may naturally have one of the configurations described in the above-described second to seventh embodiments or a configuration obtained by modifying the configurations. The angle of intersection between the first ion beam axis C3 and the second ion beam axis C4 or the like can be determined as appropriate. Rather than the tandem quadrupole mass spectrometer, as a rear stage mass separator, a quadrupole time-of-flight (Q-TOF) mass spectrometer using a time-of-flight (TOF) mass analyser can naturally have the same configuration.

Any of the previous embodiments is a mere example of the present invention, and any change modification or addition appropriately made within the spirit of the present invention will naturally fall within the scope of claims of the present application.

REFERENCE SIGNS LIST

1 . . . Ionization Chamber
2 . . . First Intermediate Vacuum Chamber
3 . . . Second Intermediate Vacuum Chamber
4 . . . Analysis Chamber
5 . . . Electrospray Nozzle
6 . . . Heated Capillary
7 . . . Skimmer
71 . . . Orifice
8 . . . Ion Guide
9 . . . Quadrupole Mass Filter
10 . . . Ion Detector
20, 20A, 20B, 20C, 20D, 20E, 20F . . . Off-Axis Ion Transport Optical System
21 . . . Front-Stage Quadrupole Ion Guide
211, 213, 214, 221, 222, 223, 224 . . . Rod Electrode
21A . . . Rear-Stage Quadrupole Array Ion Guide
211A, 212A, 213A, 214A . . . Virtual Rod Electrode
21B, 22C . . . Ion Funnel
22 . . . Rear-Stage Quadrupole Ion Guide
22A . . . Rear-Stage Quadrupole Array Ion Guide
22B . . . Radio-Frequency Carpet
22B1, 22B2, 22B3, 22B4, 22B5 . . . Ring Electrode
23, 23A, 23B . . . Ion Deflector
231, 232 . . . Flat Electrode
233, 235 . . . Outer Electrode
234 . . . Inner Electrode
30 . . . Controller
31 . . . First Radio-Frequency/Direct-Current Voltage Generator
32 . . . Second Radio-Frequency/Direct-Current Voltage Generator
33 . . . Deflection Direct-Current Voltage Generator
40 . . . Front Quadrupole Mass Filter
41 . . . Collision Cell
411 . . . Ion Entrance Port
412 . . . Ion Emission Port
42 . . . Off-Axis Ion Transport Optical System
43 . . . Front-Stage Quadrupole Ion Guide
44 . . . Rear-Stage Quadrupole Ion Guide
45 . . . Ion Deflector
46 . . . Rear Quadrupole Mass Filter
C1, C3 . . . First Ion Beam Axis
C2, C4 . . . Second Ion Beam Axis

The invention claimed is:

1. An off-axis structure ion transport apparatus that emits ions entering along a first ion beam axis along a second ion beam axis not lying on a same line as the first ion beam axis, the ion transport apparatus comprising:

a) a front-stage ion transport unit for transporting the ions while focusing the ions along the first ion beam axis by an effect of radio-frequency electric field;

b) a rear-stage ion transport unit for transporting the ions while focusing the ions along the second ion beam axis by an effect of radio-frequency electric field; and c) an ion deflector disposed between the front-stage ion transport unit and the rear-stage ion transport unit, the ion deflector for deflecting a traveling direction of the ions by an effect of a direct-current electric field so that the ions emitted from the front-stage ion transport unit reach an ion receiving range of the rear-stage ion transport unit.

2. The ion transport apparatus according to claim 1, wherein at least one of the front-stage ion transport unit and the rear-stage ion transport unit is a multipole-rod ion guide.

3. The ion transport apparatus according to claim 1, wherein at least one of the front-stage ion transport unit and the rear-stage ion transport unit is a multipole-array ion guide including a number of virtual rod electrodes each of which is composed of a number of plate electrodes arranged substantially in parallel to each other.

4. The ion transport apparatus according to claim 1, wherein at least one of the front-stage ion transport unit and the rear-stage ion transport unit is an ion funnel.

5. The ion transport apparatus according to claim 1, wherein the rear-stage ion transport unit is a radio-frequency carpet.

6. The ion transport apparatus according to claim 1, wherein the first ion beam axis and the second ion beam axis are parallel to each other.

7. The ion transport apparatus according to claim 6, wherein the ion deflector includes parallel flat electrodes provided so as to be orthogonal to a plane including the first ion beam axis and the second ion beam axis.

8. The ion transport apparatus according to claim 1, wherein the rear-stage ion transport unit is disposed so as to be off an extended line of the first ion beam axis.

9. A mass spectrometer including the ion transport apparatus according to claim 1, the mass spectrometer comprising n intermediate vacuum chambers (n is an integer equal to or greater than one) disposed between an ion source and an analysis chamber and having degrees of vacuum in an ascending order, the ion source being for ionizing a sample component under a substantially atmospheric pressure, the analysis chamber including a mass separation unit for separating ions in accordance with a mass-to-charge ratio and maintained at a high degree of vacuum, wherein the ion transport apparatus is disposed inside a first intermediate vacuum chamber next to the ion source.

10. The mass spectrometer according to claim 9, wherein a central axis of an ion introduction unit for sending ions from the ion source to the first intermediate vacuum chamber is located on a line of the first ion beam axis, and a central axis of an ion passage opening portion for sending ions from the first intermediate vacuum chamber to a next second intermediate vacuum chamber or the analysis chamber is located on a line of the second ion beam axis.

11. A mass spectrometer including the ion transport apparatus according to claim 1, the mass spectrometer comprising a first mass separation unit for selecting ions having a specific mass-to-charge ratio from among ions originating from a sample component, a collision cell for dissociating the ions selected by the mass separation unit, and a second mass separation unit for separating ions generated by dissociation in the collision cell in accordance with a mass-to-charge ratio, wherein the ion transport apparatus is disposed inside the collision cell.

12. The mass spectrometer according to claim 11, wherein the first ion beam axis and the second ion beam axis in the ion transport apparatus intersect with each other, and the first mass separation unit and the second mass separation unit are nonlinearly disposed across the collision cell.

* * * * *